Dec. 11, 1923.

1,477,212

H. ECKERTZ

APPARATUS FOR LOADING MOTOR VEHICLES

Filed April 26, 1921  4 Sheets-Sheet 1

Inventor
Heinrich Eckertz
By
Attys

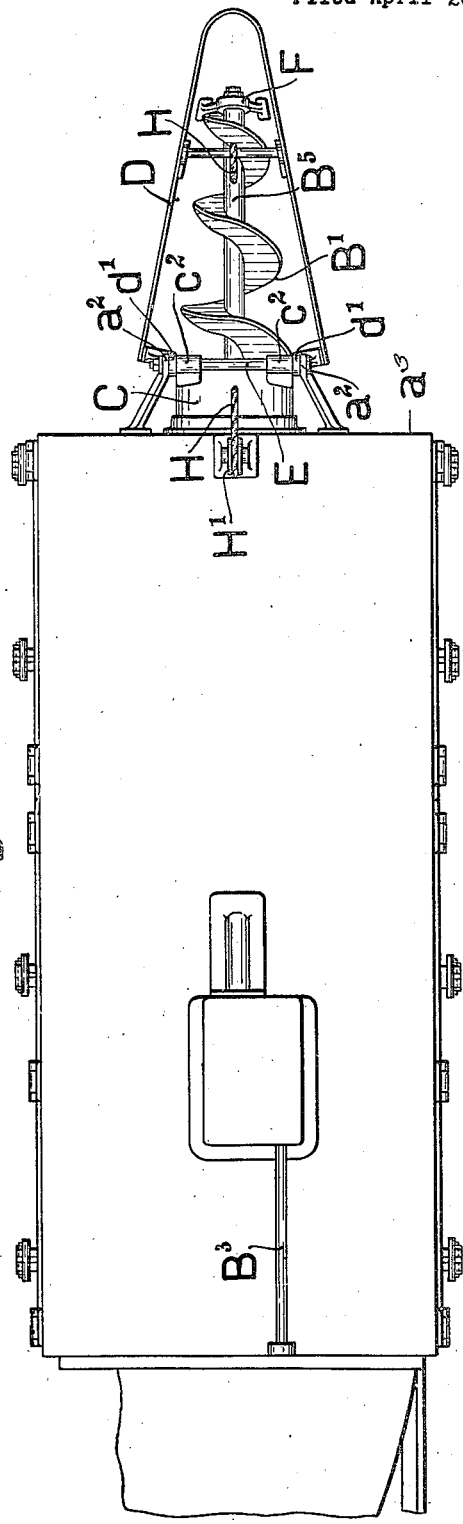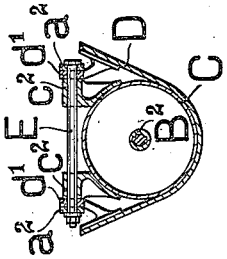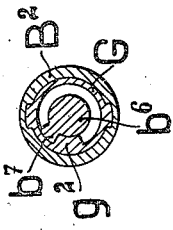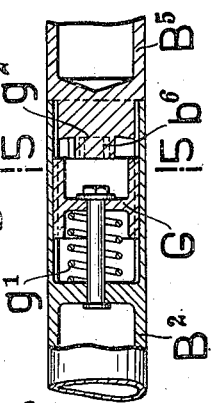

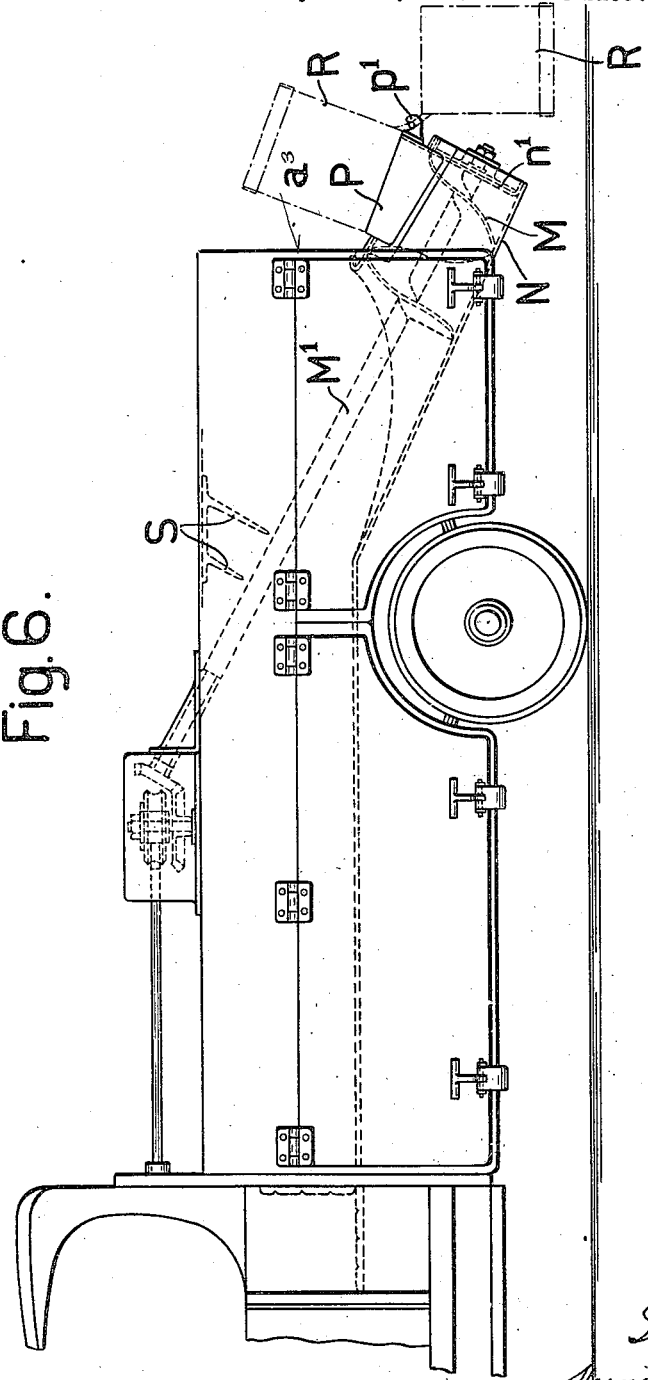

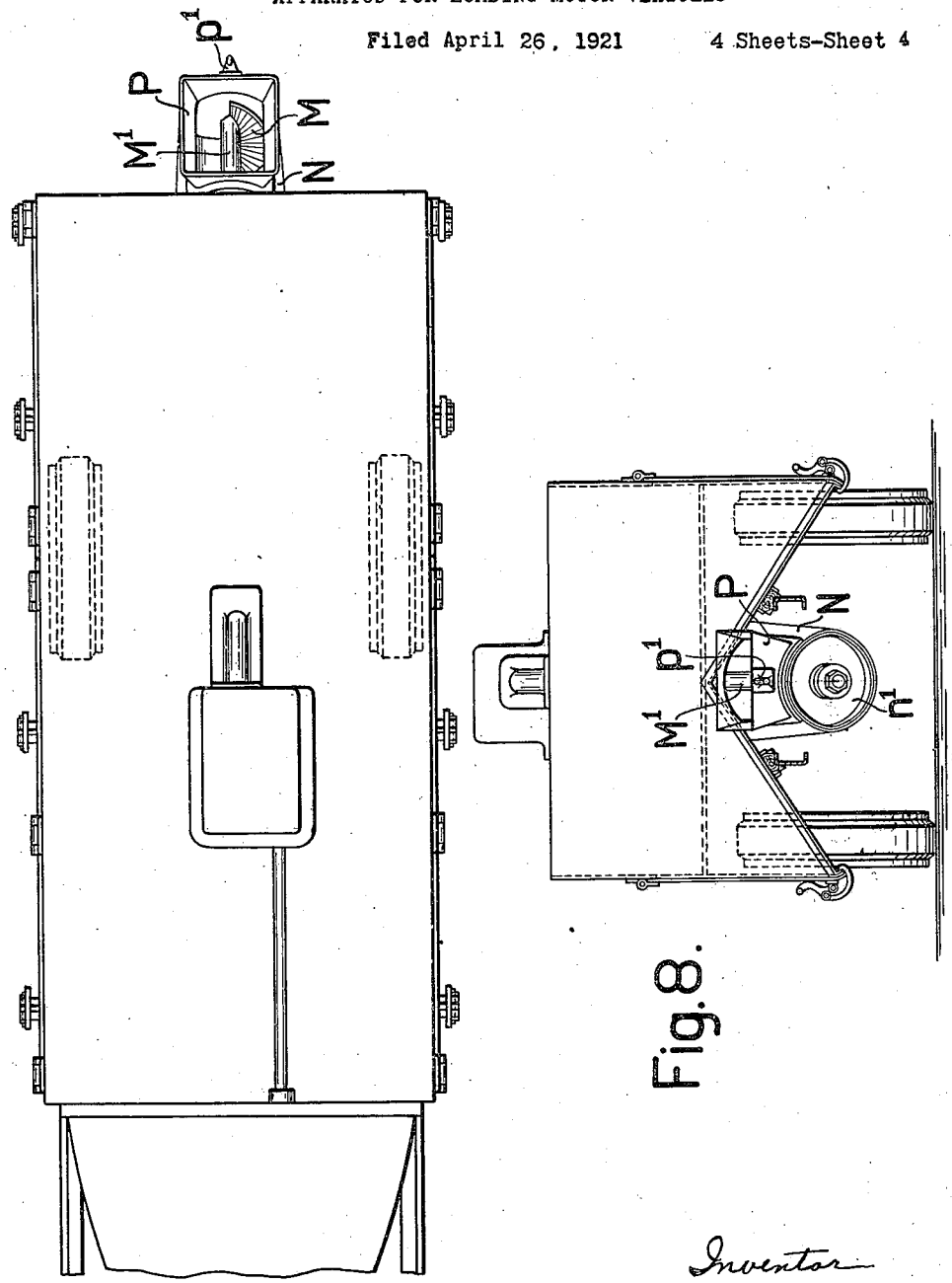

Patented Dec. 11, 1923.

1,477,212

UNITED STATES PATENT OFFICE.

HEINRICH ECKERTZ, OF ESSEN-RELLINGHAUSEN, GERMANY, ASSIGNOR TO FRIED. KRUPP AKTIENGESELLSCHAFT, OF ESSEN-ON-THE-RUHR, GERMANY.

APPARATUS FOR LOADING MOTOR VEHICLES.

Application filed April 26, 1921. Serial No. 464,689.

(GRANTED UNDER THE PROVISIONS OF THE ACT OF MARCH 3, 1921, 41 STAT. L., 1313.)

*To all whom it may concern:*

Be it known that I, HEINRICH ECKERTZ, residing at Essen-Rellinghausen, Germany, a citizen of the German Republic, have invented a certain new and useful Improvement in Apparatus for Loading Motor Vehicles, for which I have filed applications in Germany, filed February 6, 1920, Patent No. 356,877; France, filed March 29, 1921; Italy, filed March 22, 1921; Great Britain, filed March 17, 1921, of which the following is a specification.

This invention relates to motor vehicles, which serve for the conveyance of loose material or the like (e. g. sand, coal, dust, etc.).

The invention consists in an arrangement of a conveyor screw in such a way that the material can be pressed by the screw into the closed body of the vehicle.

The invention will be described with reference to the accompanying drawings which show two embodiments of the subject-matter of the invention by way of example.

In these drawings—

Figure 2 is the top plan view of Figure 1, Figure 3 is a section on the line 3—3 of Figure 1, Figure 4 shows on a larger scale a detail in longitudinal section, Figure 5 is a section on the line 5—5 of Figure 4.

Figure 6 is a side elevation of the second embodiment of the apparatus together with the vehicle.

Figure 7 is the top plan view corresponding to Figure 6 and

Figure 8 is the right hand end view of Figure 6.

Figure 1:
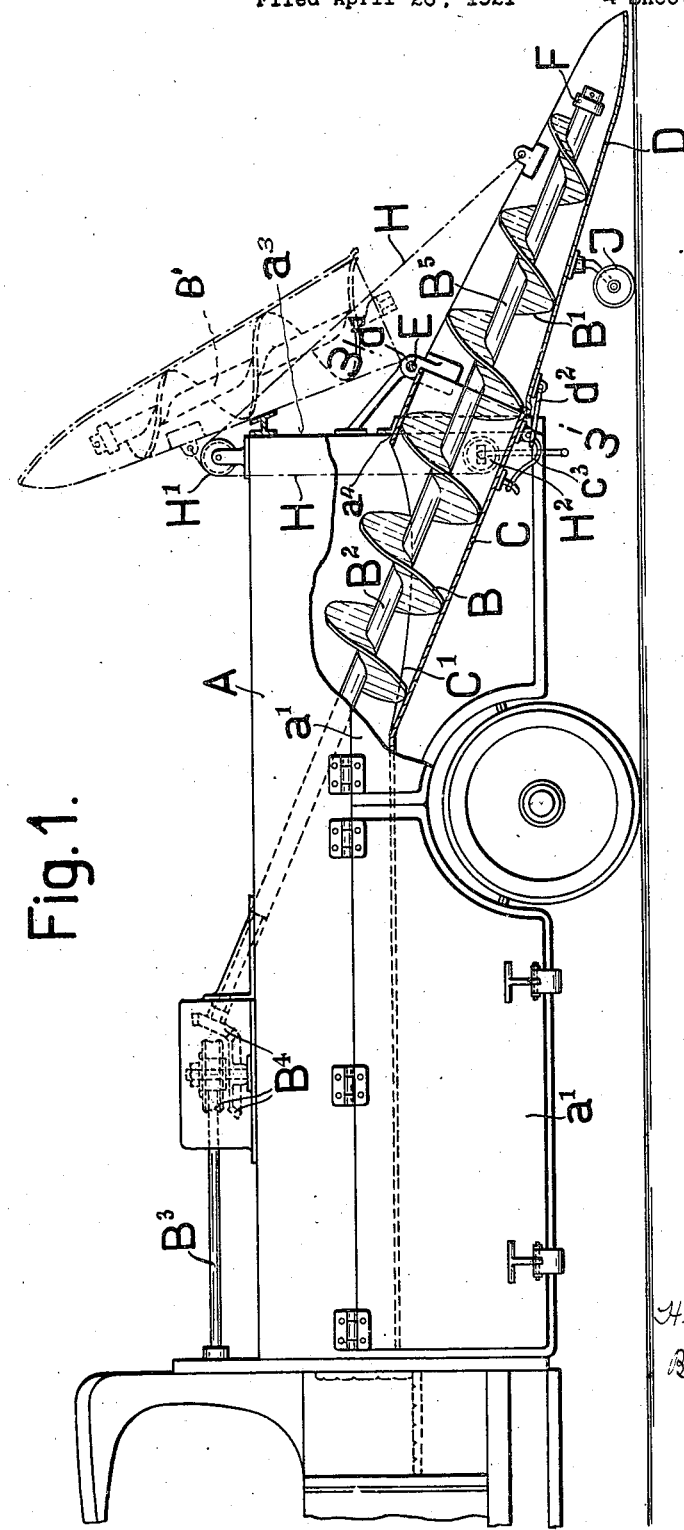
Figure 1 shows a side elevation, partially in section, of the first embodiment of the apparatus together with the vehicle.

The arrangement shown in Figures 1 to 5 will be described first.

The vehicle has a body A (see Figure 1) which is closed at the top by a cover particularly in the loading process and has discharging doors $a^1$ at the sides. The vehicle is loaded by a conveyor screw which consists of two parts B, $B^1$ (see Figure 1). The shaft $B^2$ of the conveyor screw portion B lies in the vertical longitudinal plane of the vehicle. At the same time the shaft $B^2$ is inclined rearwards and downwards. The said shaft $B^2$ is driven by the motor of the vehicle through the medium of a horizontal shaft $B^3$ and a countershaft $B^4$. The screw portion B, which terminates immediately behind the body of the vehicle, works in a tubular piece C which is inserted in the rear wall $a^3$ of the body of the vehicle and in the interior of the latter passes over into a trough $C^1$ (see Figure 1). The screw portion $B^1$ works in a trough D, which can be rocked about a horizontal axis. For this purpose a bolt E, on which the trough D is mounted by means of eyes $d^1$, is carried in eyes $a^2$ and $c^2$ (see Figures 2 and 3) which are mounted on the rear wall $a^3$ of the body of the vehicle and on the tubular piece C. The shaft $B^5$ of the portion $B^1$ of the screw is adapted to rotate at its outer end in a bearing F mounted on the trough D. The other end of the shaft $B^5$ can be coupled to the shaft $B^2$ by means of a claw clutch. This clutch has a sleeve G (see Figures 4 and 5) which is movable longitudinally in the shaft $B^2$ against the action of a spring $g^1$ (see Figure 4), but is connected to the shaft so as to be incapable of rotating separately by a feather and groove. On this sleeve there is mounted a claw $g^2$ (see particularly Figure 5) against which a claw $b^7$ which is mounted on a journal $b^6$ of the shaft $B^5$ is adapted to bear.

The trough D with the portion $B^1$ of the screw is adapted to be drawn up off the ground by means of a windlass, the rope H of which (see Figures 1 and 2) is passed over a fixed roller $H^1$ to the drum $H^2$ of the windlass. On the trough D is mounted a roller J (see Figure 1) for the purpose of supporting the trough upon the ground. The trough is also provided with an eye $d^2$ shaped like the link of a chain (see Figure 1) which serves to secure the trough in the operative position by means of a hook $c^3$ mounted on the tubular piece C.

When the trough D is in the operative position in which the roller J rests upon the ground, the portion $B^1$ of the screw forms an extension of the part B of the screw. The claw $b^7$ is situated in the path of the claw $g^2$, or the claw $b^7$ has pushed the sleeve G, if it has got behind the claw $g^2$ when the trough D was let down, forwards within the shaft $B^2$ against the action of the spring $q^1$. In the latter case the clutch $b^7$ $g^2$ will be thrown into engagement after a slight rotation of the shaft $B^2$. In the operative position of the trough D its outer end lies immediately above the ground.

When it is desired to transfer material such as coal or sand lying on the ground to the body of the vehicle the latter is run backwards up to the material, the screw B $B^1$ started and supplied with the material by a shovel or by running the vehicle farther back or moving it sideways.

The pitch of the screw decreases towards the interior of the body of the vehicle, so that during the working of the screw a pressure effect is produced by which the material is pressed into the body of the vehicle closed by its cover and also distributed therein. When the vehicle is traveling the trough D is turned up together with the portion $B^1$ of the screw.

In the arrangement illustrated in Figures 6 to 8 a conveyor screw M consisting of one piece is provided, the tubular casing N of which terminates behind the body of the vehicle at some height above the ground. The casing N is closed at the rear by a bottom $n^1$, in which the shaft $M^1$ of the screw is carried in a bearing. At the top on the other hand the casing N has an opening, into which a hopper or chute P opens. To this hopper is fixed a hook $p^1$ for buckets R for the material (particularly dust) to be conveyed by the vehicle. Two prongs S (see Figure 6) are also provided on the cover of the body of the vehicle for the purpose of detaching substances such as rags, etc., occurring in the dust and which have become wrapped round the shaft $M^1$.

The dust is brought to the vehicle in the buckets R which are then attached to the hook $p^1$ and tipped into the hopper P, so that the dust can be conveyed into the body of the vehicle by the screw M which is driven by the motor of the vehicle. When the body of the vehicle is full its cover becomes raised by the pressure of the dust forced into the body by the screw. The driving mechanism of the screw is then stopped.

Claims.

1. A vehicle having in combination a closed receptacle and a screw conveyer for loading the vehicle, said conveyer entering the receptacle near the bottom thereof and being provided with a stationary casing at its point of entrance, whereby the forcing action of the conveyer on the load combined with the restraining action of the walls of the container effects a complete filling of the container.

2. A vehicle having in combination with a closed receptacle a screw conveyer consisting of interior and exterior portions with regard to the said receptacle, means whereby one of said portions may be displaced at will, and means whereby the said portion may be again brought and held in working alignment.

3. A vehicle having a closed receptacle in combination with a downwardly inclined screw conveyer for loading the vehicle, said screw conveyer leading into the receptacle near the bottom thereof and consisting of an interior and exterior portion with regard to the said receptacle, the said interior portion being in a fixed position and connected by a hinge at the top of its lower extremity to the exterior portion, means whereby the latter, through the uncoupling of the screw members of the respective portions, may at will be swung upward and inward or again brought into working alignment and means for holding the said portions and their component parts in this position.

4. A construction as described in claim 3 in which the screw member consists of two joined portions, the pitch of the said screw member as a whole decreasing towards its inner end as and for the purpose hereinbefore described.

The foregoing specification signed at Essen, Germany, this 2nd day of March, 1921.

HEINRICH ECKERTZ.